(12) United States Patent
Boyce

(10) Patent No.: US 6,390,280 B1
(45) Date of Patent: May 21, 2002

(54) FEED HOPPER WITH BAFFLE PLATES

(76) Inventor: Keith W. Boyce, 1005 Lorraine St., Philadelphia, PA (US) 19116

( * ) Notice: Subject to any disclaimer, the term of this patent is extended or adjusted under 35 U.S.C. 154(b) by 0 days.

(21) Appl. No.: 09/504,363
(22) Filed: Feb. 15, 2000
(51) Int. Cl.⁷ ............................................... B65G 47/18
(52) U.S. Cl. ....................................... 198/540; 198/530
(58) Field of Search ................................ 198/540, 530, 198/444, 455, 524, 532, 393, 397.06, 453, 534; 193/32

(56) References Cited

U.S. PATENT DOCUMENTS

| 2,854,372 A | | 9/1958 | Yan et al. ..................... 154/101 |
|---|---|---|---|
| 2,859,689 A | | 11/1958 | Ackley .......................... 101/35 |
| 2,931,292 A | | 4/1960 | Ackley .......................... 101/37 |
| 3,084,781 A | | 4/1963 | Merrill .......................... 198/33 |
| 3,556,281 A | | 1/1971 | Margaroli ..................... 198/33 |
| 3,738,507 A | * | 6/1973 | Livingston ................. 214/16 R |
| 3,995,732 A | * | 12/1976 | Figes et al. .................... 198/524 |
| 4,082,177 A | * | 4/1978 | Aidlin et al. ................. 198/453 |
| 4,126,219 A | | 11/1978 | Bross ........................... 198/382 |
| 4,149,659 A | * | 4/1979 | Reed et al. ................... 222/318 |
| 4,308,942 A | * | 1/1982 | Ackley ......................... 198/380 |
| 4,335,810 A | * | 6/1982 | Ackley et al. ............... 198/380 |
| 4,353,456 A | * | 10/1982 | Yamamoto ................... 198/397 |
| 4,632,028 A | * | 12/1986 | Ackley ......................... 101/40 |
| 4,732,263 A | | 3/1988 | Franciscus ............. 198/550.13 |
| 4,871,059 A | * | 10/1989 | Rantanen et al. ........... 198/532 |
| 5,762,712 A | * | 6/1998 | Sohn ........................... 118/419 |
| 5,871,080 A | * | 2/1999 | Manzi et al. ................ 198/396 |
| 5,960,990 A | | 10/1999 | Radosevich ..................... 222/1 |

* cited by examiner

Primary Examiner—Christopher P. Ellis
Assistant Examiner—Rashmi Sharma
(74) Attorney, Agent, or Firm—Synnestvedt & Lechner LLP

(57) ABSTRACT

A feed hopper for loading a conveyor with bulk pellet-like items is disclosed. The hopper has a chamber with a top opening for receiving the items and a bottom opening positioned above the conveyor for discharging the items. A plurality of baffle plates are arranged in spaced relation one above the other within the chamber, the baffle plates being angularly oriented with respect to the horizontal and extending partially across the chamber. Bulk pellet-like items received in the top opening impact on the baffle plates as they fall under gravity through the chamber onto the conveyor beneath, the weight of the pellets being supported by the baffle plates and not directly all at once on the conveyor. The lowermost baffle plate is rotatably movable between an open position wherein the plate is in spaced relation with the above positioned neighboring plate, and a closed position whereby an edge of the movable baffle plate is brought into contact with an edge of the neighboring plate, thereby closing off the chamber and preventing items from passing through to the conveyor. The hopper includes a device for measuring the quantity of items on the conveyor, and when this quantity exceeds a predetermined limit, the movable baffle plate is positioned to close off the chamber, the plate being moved back to the open position when the quantity is lower than a second predetermined amount less than the first quantity.

15 Claims, 6 Drawing Sheets

FEED HOPPER WITH BAFFLE PLATES

FIELD OF THE INVENTION

This invention relates to feed hoppers for bulk items and especially to feed hoppers for feeding pellet-like items to a conveyor in a controlled manner.

BACKGROUND OF THE INVENTION

In the manufacture of many pharmaceutical products such as pills or lozenges, candies such as "MIM's®" and small mechanical parts, it is often desirable to imprint a trademark, indicia or other information or intelligence on each item. These products share a common characteristic in that they are all pellet-like, being small, often round or rounded, oval, bulbous, cylindrical or polygonal in shape. Examples of pellet-like items are pills, lozenges, capsules, tablets and caplets.

Imprinting indicia on a series of pellet-like items is conveniently accomplished by a machine which receives a large number of items in bulk, typically from a feed hopper or bin, orients the items to a uniform relative orientation, conveys the oriented items to a printing unit wherein the indicia are applied to each item and discharges the items for subsequent packaging. U.S. Pat. No. 2,859,689 to Ackley is a typical example of a pellet-marking machine which performs the steps outlined above. Pellet-like items, seen in FIG. 2 of the '689 patent, designated "P", are loaded in bulk into the feed hopper 22 where the items are received by a rotating drum or cylinder roll 23. The drum has a multiplicity of concavities or recesses 33 in its outwardly facing surface formed in accordance with the shape and size of the pellet-like items being processed. The items P are received into the concavities 33 as the drum rotates clockwise beneath hopper 22, retained in the concavities by cylindrical retainer surface 50 as the drum rotates and released to an endless conveyor 24 located beneath the drum, the conveyor having a multiplicity of individual carrier bars 110. Carrier bars 110 have corresponding concavities matching the concavities 33 in drum 23, and conveyor 24 is synchronized with drum 23 so that the matching concavities on the drum and the conveyor line up as the drum rotates clockwise and the conveyor circulates counterclockwise. Items P drop from concavities 33 in drum 23 into the matching concavities in the endless conveyor 24 once the items are clear of retaining surface 50. The pellet-like items P are then conveyed to a printing roller 27 which has ink laden images of the indicia or intelligence to be imprinted on the items circumferentially arrayed on its peripheral surface. Printing roller 27 rotates clockwise in synchronization with endless conveyor 24 and contacts the pellet-like items P as they pass beneath the printing roller 27, applying the ink laden image to each pellet-like item. After passing beneath printing roller 27 the pellet-like items P are discharged from conveyor 24 as the conveyor rounds its drive sprocket and the carrier bars 110 are momentarily vertically oriented.

Using a rotating drum to effect the orderly transfer of pellet-like items from the feed hopper to the conveyor avoids overburdening the conveyor with the weight of all of the items in the feed hopper, as the drum bears this weight. However, the rotating drum has numerous disadvantages. The drum is an expensive and massive part of the machine which must be strong enough to withstand the weight of the items in the feed hopper. This increases the machine cost and weight. The drum is a moving part, the rotation of which must be synchronized with the conveyor motion, thus, increasing the machine complexity. Close tolerances must be maintained between the drum and the retaining surface to keep the items in place, and pellet-like items which are not properly seated within the cavities tend to be pinched and crushed between the drum and the surface due to the close tolerances. This is especially messy when liquid filled capsules are being processed, because the liquid from crushed capsules contaminates the drum surface and coats capsules contacted by the drum unless the machine is shut down and the liquid cleaned up. This results in significant machine down time and unacceptable loss of product throughput. Furthermore, the drum inherently limits the speed at which the machine can process items, because the drum itself cannot rotate above a critical speed at which the pellet-like items either fail to seat properly within the cavities or are flung outwardly from the hopper under the centrifugal acceleration of the spinning drum.

Clearly, it is, therefore, perceived that there is need for an improved machine for processing pellet-like items which eliminates the aforementioned disadvantages inherent in the drum machine yet provides for the orderly transfer of pellet-like items from the feed hopper to the conveyor without placing the bulk of the weight of the items directly on the conveyor.

SUMMARY AND OBJECTS OF THE INVENTION

The invention concerns a feed hopper adapted to receive a multiplicity of pellet-like items and discharge the items on a movable conveyor. Preferably, the feed hopper comprises a chamber enclosed by a plurality of side walls, the chamber having a top opening for receiving the pellet-like items and a bottom opening positioned overlying the conveyor. According to the invention, a plurality of baffle plates are arranged within the chamber in spaced relationship one above another. The baffle plates extend partially across chamber to deflect the pellet-like items along an indirect path from the top opening to the conveyor. When pellet-like items are introduced into the hopper through the top opening, they impact on at least one of the baffle plates. The baffle plates impede the flow of the pellet-like items through the hopper before they land on the conveyor. One of the chamber side walls is arranged substantially transversely to the direction of motion of the conveyor, the one side wall having an opening positioned adjacent to the conveyor. When the conveyor moves, the pellet-like items on the conveyor are discharged from the chamber through the opening.

The feed hopper preferably has first and second oppositely arranged side walls disposed transversely to the direction of motion of the conveyor, one of the side walls having the above mentioned opening through which the pellet-like items are discharged. At least one baffle plate is positioned within the chamber with a first edge adjacent to the first side wall and a second edge arranged distally to the first edge and extending toward the second, opposite side wall. At least another baffle plate is arranged having a first edge adjacent to the second side wall and a second edge arranged distally to the first edge and extending toward the first side wall. Both baffle plates are inclined at an angle by arranging the second edge at a lower level than the first edge for each respective baffle plate.

The two baffle plates described above are preferably arranged vertically adjacent one above another, with no other baffle plates in between. One of the baffle plates is movable between an open position in spaced relation to the other baffle plate, and a closed position wherein the second edge of the one baffle plate is contiguous with the second edge of the other baffle plate thereby closing off the chamber and preventing movement of the pellet-like items through the hopper to the conveyor. In the preferred embodiment, the lower of the two baffle plates is rotatably movable between the open and closed positions to effect the closure of the chamber, and this movable baffle plate is positioned lowermost of all the baffle plates within the chamber.

As noted above, it is desirable not to overload the conveyor with an excessive amount of pellet-like items. The conveyor is not designed to bear the full weight of product which can be loaded into the hopper. Therefore, it is convenient to associate with the hopper a means for measuring the quantity of the pellet-like items received on the conveyor and a means for moving the first baffle plate between the open and the closed positions, and a means for controlling the moving means in response to the quantity of pellet-like items measured.

The controlling means causes the moving means to move the first baffle plate from the open to the closed position when the quantity measured exceeds a first predetermined amount. This prevents further of the pellet-like items from being received on the conveyor. The controlling means also causes the moving means to move the first baffle plate from the closed to the open position when the quantity measured is less than a second predetermined amount which is also less than the first predetermined amount. This allows further of the pellet-like items to be received on said conveyor.

In the preferred embodiment, the measuring means comprises a light source mounted within the chamber. The light source projects a light beam across the chamber at a predetermined level above the conveyor to a light sensor also mounted within the chamber, facing the light source and aligned to receive the beam. The light beam projects unimpeded across the chamber from the light source to the light sensor when the pellet-like items received on the conveyor are below the level of the light beam. This level of pellet-like items corresponds to an acceptable amount of product on the conveyor, and the moveable baffle plate remains in the open position allowing items to pass from the hopper to the conveyor. However, the light beam is interrupted by the pellet-like items received on the conveyor when the pellet-like items are above the level of the light beam. This corresponds to near an unacceptable amount of items on the conveyor and exceeds the predetermined amount allowed on the conveyor. Interruption of the light beam triggers, via the controlling means, the movement of the movable baffle plate to the closed position which prevents further pellet-like items from reaching the conveyor. As the conveyor moves the pellet-like items from the hopper, the level of the items decreases and the light beam again projects unimpeded from the source to the sensor. Resumption of the light beam being sensed by the sensor triggers the movement of the baffle plate to the open position allowing pellet-like items to flow through the hopper to the conveyor.

For delicate or brittle items, it is sometimes necessary to mitigate or soften the impact of the item on the baffle plates. This is accomplished by providing the upwardly facing surface of the baffle plates with a layer of flexible material cushioning the impact of the pellet-like items on the baffle plates.

In machines where the conveyor has carrier bars having a multiplicity of cavities for receiving and transporting the pellet-like items, the hopper is equipped with a guard member. The guard member extends substantially transversely to the direction of motion of the conveyor and is positioned adjacent to the opening discharging the items. The guard member engages a first portion of the pellet-like items which are not received within the cavities and retains this first portion within the chamber when the conveyor is moving. A second portion of the pellet-like items which are properly received in the cavities are not retained by the guard member and are discharged through the opening and out of the chamber on the conveyor.

In the preferred embodiment, the guard member is an elongated rotatable brush having a multiplicity of flexible bristles extending radially outwardly. The brush is rotatable about an axis arranged substantially transversely to the direction of motion of the conveyor and means for rotating the brush, such as an electric motor, are operatively connected to the brush. The brush is rotated in opposition to the motion of the conveyor and the bristles engage the conveyor and sweep the first portion of pellet-like items (those items not arranged within the cavities of the conveyor) back into the chamber. The second portion of the pellet-like items received in the cavities are not swept back but bypass the brush and are transported through the opening and discharged from the chamber on the conveyor.

Pellet-like items falling through the hopper onto the carrier bars of the conveyor are randomly oriented and do not automatically align themselves and seat within the cavities in the carrier bars. To encourage the proper alignment of the pellet-like items, the hopper is fitted with at least two elongated guide bars mounted within the chamber. The guide bars are arranged parallel to the direction of motion of the conveyor and positioned in spaced relationship to each other on opposite sides of one of the cavities, thereby forming a trough for guiding the pellet-like items into the cavity.

The invention also includes a method of loading a movable conveyor with a multiplicity of pellet-like items. The method comprises the steps of:

(A) positioning a feed hopper above the conveyor, the feed hopper comprising a chamber having a top opening and a bottom opening overlying the conveyor;

(B) providing a plurality of baffle plates within the chamber, the baffle plates being angularly oriented with respect to the horizontal one above another and extending partially across the chamber;

(C) providing an opening in the chamber adjacent to the conveyor and transversely to the direction of motion of the conveyor;

(D) introducing the pellet-like items into the chamber through the top opening, the items passing through the chamber under gravity and contacting at least one of the baffle plates before emerging from the bottom opening onto the conveyor, the baffle plates impeding the flow of the pellet-like items from the hopper to the conveyor; and (E) moving the pellet-like items on said conveyor from beneath said hopper through said opening.

It is desirable to include in the method further steps to control the flow of pellet-like items through the chamber so as to avoid overloading the conveyor. The further steps comprise:

(F) providing a means for measuring a quantity of the pellet-like items on the conveyor;

(G) providing a baffle plate movable between an open position allowing the pellet-like items to move through the chamber to a closed position blocking the chamber between the top and the bottom openings;

(H) providing a means for moving the baffle plate in cooperation with the measuring means;

(I) providing a means for controlling the moving means in response to the quantity measured by said measuring means;

(J) measuring the quantity of pellet-like items on the conveyor;

(K) moving the movable baffle plate into the closed position when the quantity exceeds a first predetermined amount, thereby halting the flow of the pellet-like items through the hopper onto the conveyor; and (L) moving the movable baffle plate into the open position when the quantity is less than a second predetermined amount less than the first predetermined amount, thereby permitting the flow of the pellet-like items through the hopper.

It is an object of the invention to provide a feed hopper for loading a plurality of pellet-like items onto a conveyor.

It is another object of the invention to provide a feed hopper which provides for the orderly transfer of pellet-like items to the conveyor.

It is still another object of the invention to provide a feed hopper which eliminates the need for a rotating drum in pellet-marking machines.

A further object of the invention is to provide a feed hopper which controls the flow of pellet-like items onto the conveyor.

The objects of the invention include the provision of a feed hopper which prevents the pellet-like items from being deposited directly onto the conveyor.

The objects of the invention further include the provision of a feed hopper which prevents the full weight of pellet-like items in the hopper from being supported on the conveyor.

These and other objects can be discerned from a consideration of the following drawings and detailed description of the invention.

DETAILED DESCRIPTION OF THE PREFERRED EMBODIMENT

Figure 1:
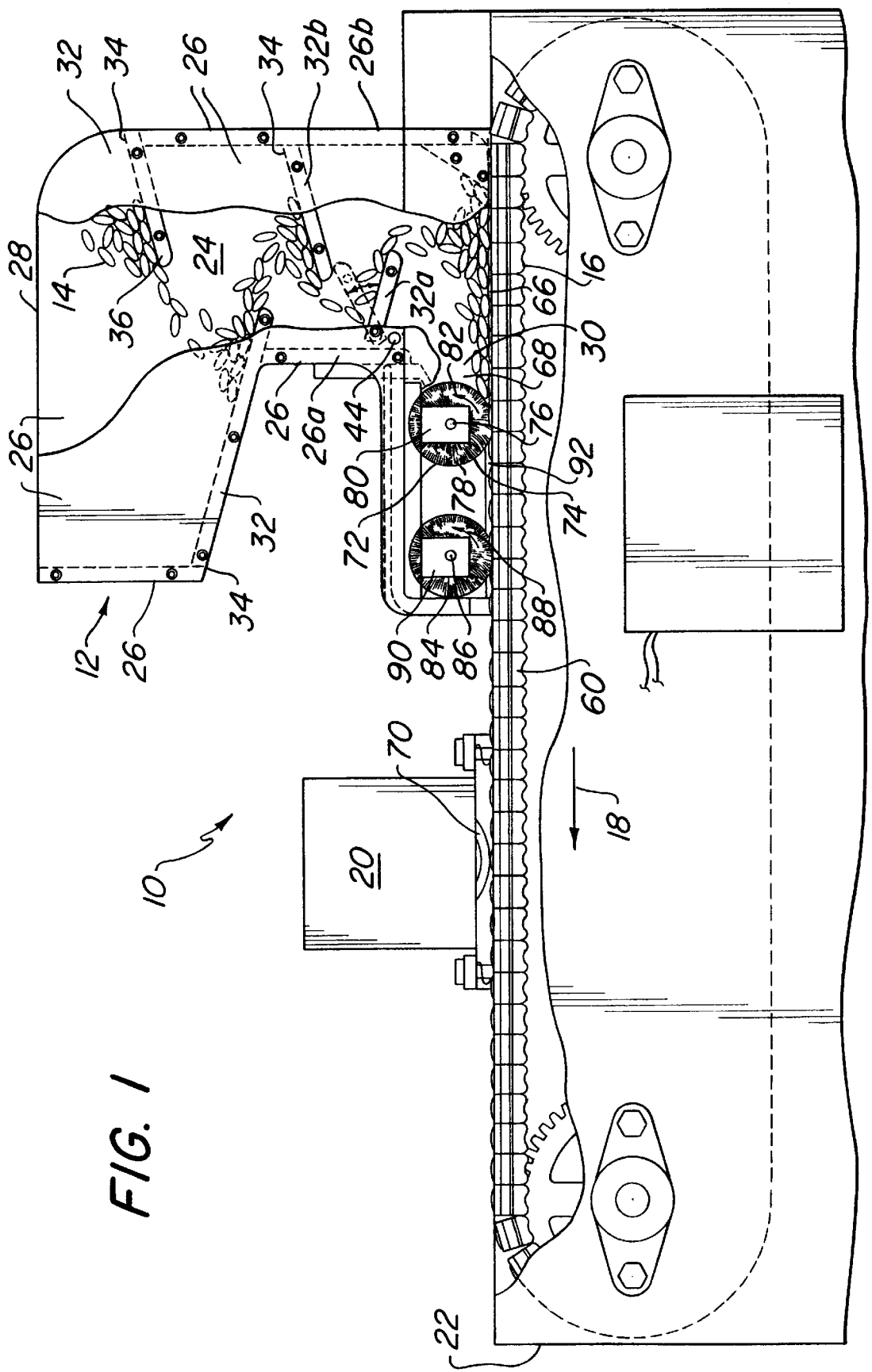
FIG. 1 is a partial cross-sectional side view of a pellet marking machine having a feed hopper according to the invention.

FIG. 1 shows a pellet-marking machine 10 having a feed hopper 12 which feeds pellet-like items 14 to an endless conveyor 16 which transports the pellet-like items in the direction denoted by arrow 18 to a printing unit 20. Printing unit 20 prints indicia, for example, a brand name, on items 14, and conveyor 16 moves items 14 further to the point 22 where they are ejected from the conveyor for further processing or packaging.

Feed hopper 12 according to the invention comprises a chamber 24 enclosed by a plurality of sidewalls 26. Feed hopper 12 has a top opening 28 for receiving the pellet-like items 14 and a bottom opening 30 positioned overlying conveyor 16. A plurality of baffle plates 32 are arranged within chamber 24 in spaced relationship one above another. In the preferred embodiment, baffle plates 32 each have a proximal edge 34 arranged adjacent to one of the sidewalls 26 and distal edge 36 extending toward an opposite sidewall. The baffle plates 32 extend partially across chamber 24 and provide a means for deflecting the items 14 from a straight path extending between the top and bottom openings. As seen in FIG. 1, items 14 flow through chamber 24 under gravity, impacting on the baffle plates 32 and cascading from one plate to another as they pass through the chamber. To facilitate the movement of the items, baffle plates 32 are angularly oriented with respect to the horizontal, with the distal edge 36 of the baffle plate 32 positioned at a lower level than the proximal edge 34.

Preferably, the proximal edges 34 of baffle plates 32 are adjacent to side walls 26a and 26b which are arranged transversely to the direction of motion of conveyor 16, the direction of motion denoted by arrow 18.

The baffle plates 32 control the flow of pellet-like items onto conveyor 16 and prevent the full weight of the pellet-like items in the hopper from being supported by the conveyor at one time. As part of this control function, it is sometimes necessary to temporarily halt the flow of pellet-like items through the hopper 12, for example, if pellet-like items are received into the hopper at a greater rate than they can be discharged by the conveyor. Left alone, this condition will otherwise result in pellet-like items accumulating on and eventually overburdening the conveyor. However, the hopper is used to meter the flow of pellet-like items by halting the flow when certain conditions, described below, occur and allowing the flow to resume once the conditions have passed.

Figure 2:
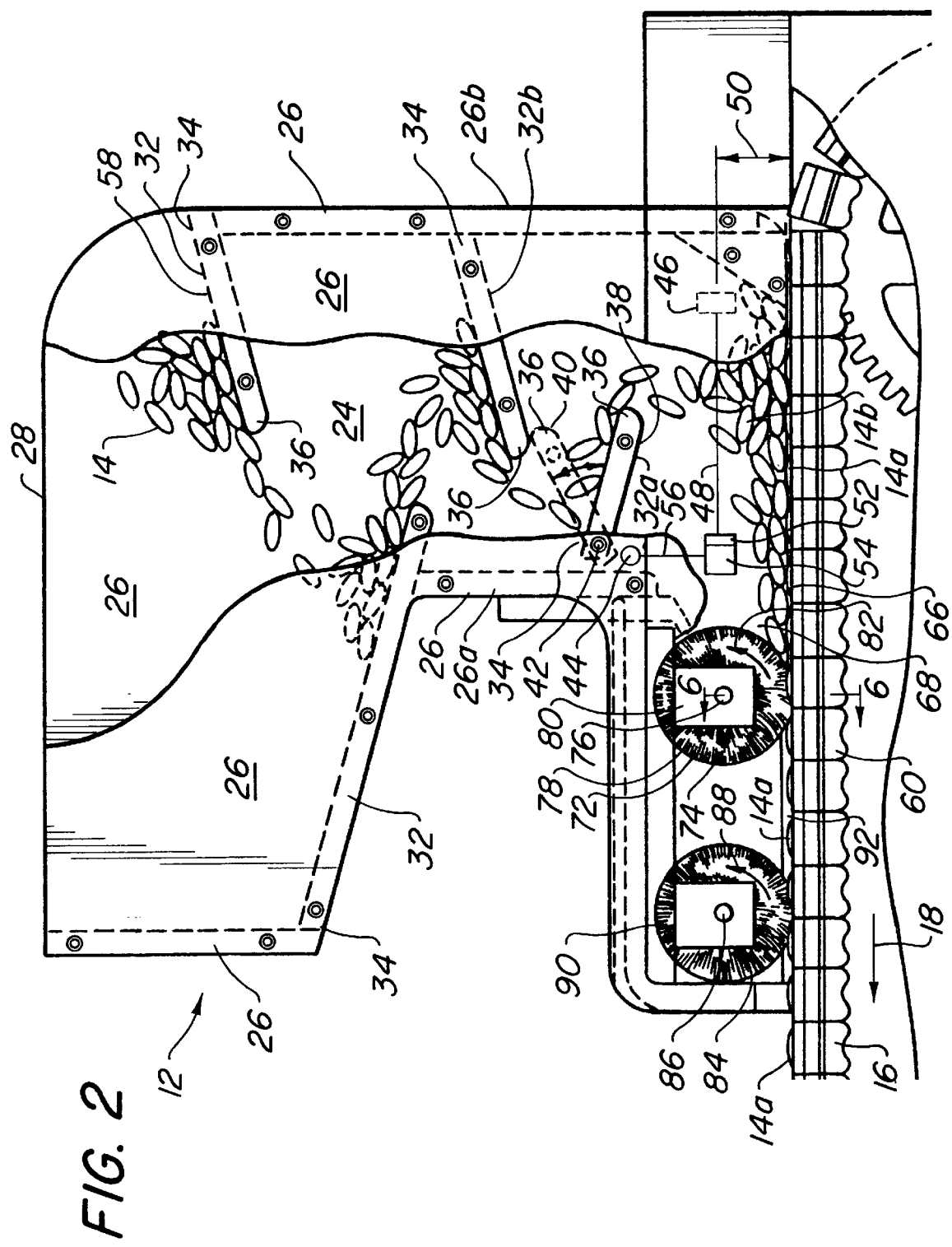
FIG. 2 is a detailed view of the hopper shown in FIG. 1, on an enlarged scale.

As best seen in FIG. 2, the flow of pellet-like items is halted by mounting a movable baffle plate 32a within the hopper, the baffle plate 32a being movable between an open position denoted by reference character 38 and shown in solid line and a closed position, seen in dashed line, and denoted by reference character 40. Preferably, movable baffle plate 32a is positioned lowermost of all the baffle plates allowing the majority of the hopper volume to act as a reservoir and accumulate items 14 while baffle plate 32a is temporarily closed. Baffle plate 32a is rotatably mounted within the hopper with an axis of rotation 42 located at its proximal end 34. To halt the flow of items 14, baffle plate 32a is moved into closed position 40 by rotating the baffle plate about axis 42, bringing its distal end 36 contiguous with the distal end 36 of a baffle plate 32b positioned vertically adjacent to movable baffle plate 32a. As shown in FIG. 2, this closes off the chamber and prevents the movement of pellet-like items 14 therethrough. The flow is resumed when baffle plate 32a is rotated in the opposite direction back into the open position 38.

It is preferred to use an electric motor 44 operatively coupled to movable baffle plate 32a as a means for moving the baffle plate between the open and closed positions. Other means, such as solenoids and pneumatic and hydraulic actuators, are also feasible.

The position of baffle plate 32a is controlled in response to the quantity of pellet-like items 14 received on the conveyor 16 as measured by a measuring means positioned within chamber. In the preferred embodiment, seen in FIG.

2, the measuring means comprises a light source 46 mounted within the chamber 24. The light source projects a beam of light 48 across the chamber at a predetermined level 50 above the conveyor 16. A light sensor 52 is mounted within the chamber facing light source 46 and aligned to receive light beam 48. The level 50 is selected to correspond to a predetermined amount of items 14 permitted on conveyor 16 which does not overload the conveyor. As long as items 14 remain below the level 50, light beam 48 projects unimpeded across chamber 24 and baffle plate 32a remains in the open position allowing items 14 to flow through the hopper 12. However, when the quantity of items 14 exceeds the level 50, indicating that too many items are on the conveyor, the light beam is interrupted. Light sensor 52 works in cooperation with a means for controlling motor 44, preferably a microprocessor 54. The microprocessor 54 receives a signal from the sensor 52 when the beam is interrupted and in response actuates motor 44 through control line 56, moving the baffle plate 32a into the closed position 40, thereby preventing further of the items 14 from being received on the conveyor. Conveyor 16 removes items 14 from the chamber, reducing the level of items 14 to below the level 50, whereupon the light beam 48 again traverses the chamber 24 unimpeded and is received by sensor 52. Sensor 52 signals to microprocessor 54 that the light beam is being received, indicating that the level of items 14 on conveyor 16 is again below the limit set by level 50. Microprocessor 54 again actuates motor 44, this time moving baffle plate 32a from the closed to the open position 38, allowing the flow of pellet-like items 14 to resume through the hopper and onto the conveyor 16.

It is foreseeable that items 14 may be delicate or brittle in nature and may be easily broken when impacting on baffle plates 32 as they traverse chamber 24. To prevent damage to pellet-like items 14, the upwardly facing surface 58 of one or more baffle plates comprises a layer of flexible material, for example, foam rubber, cushioning the impact of the items 14 on the baffle plates 32.

Figure 3:
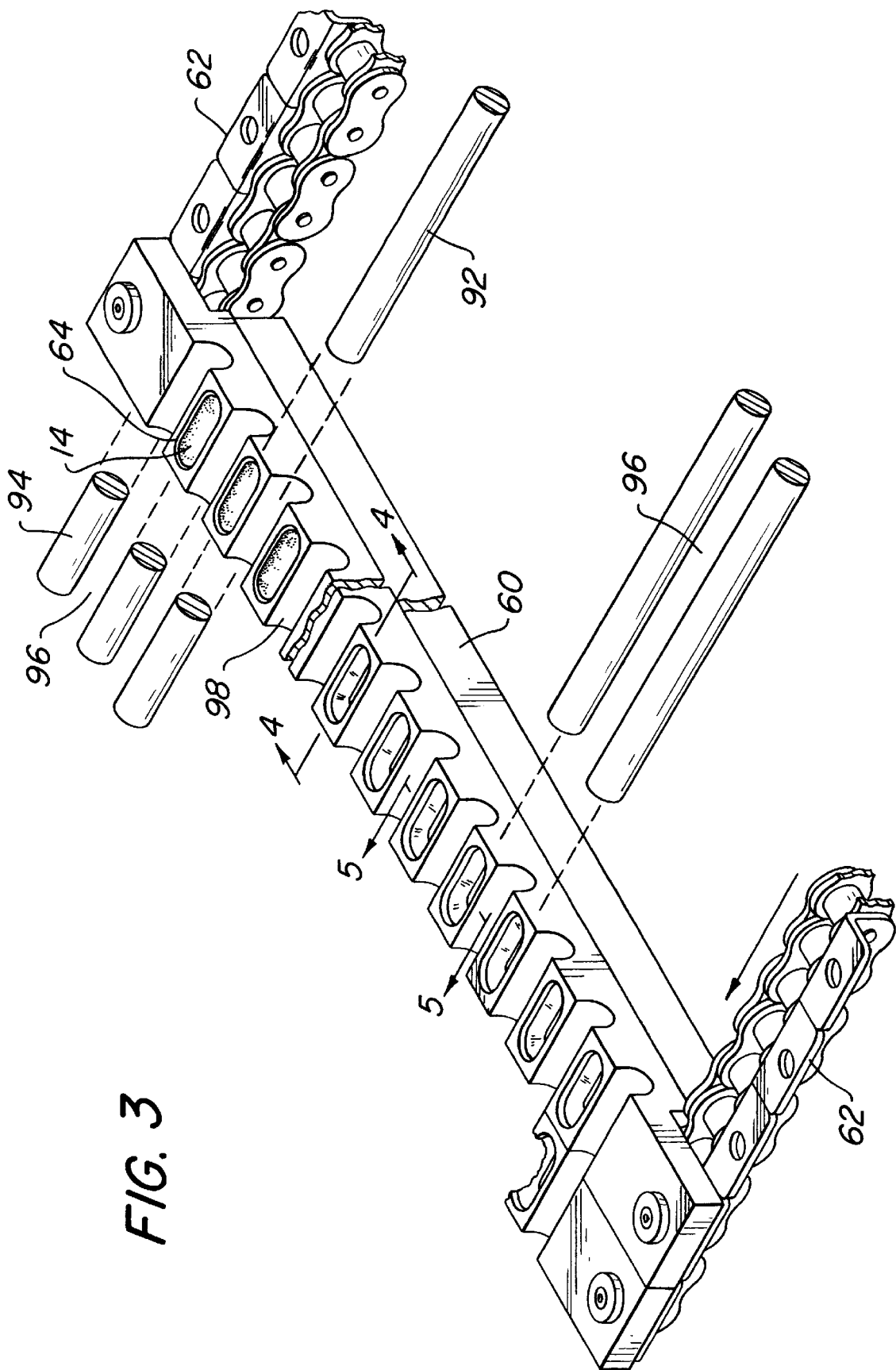
FIG. 3 is a perspective view, on an enlarged scale, of a carrier bar from FIG. 1.
Figure 4:
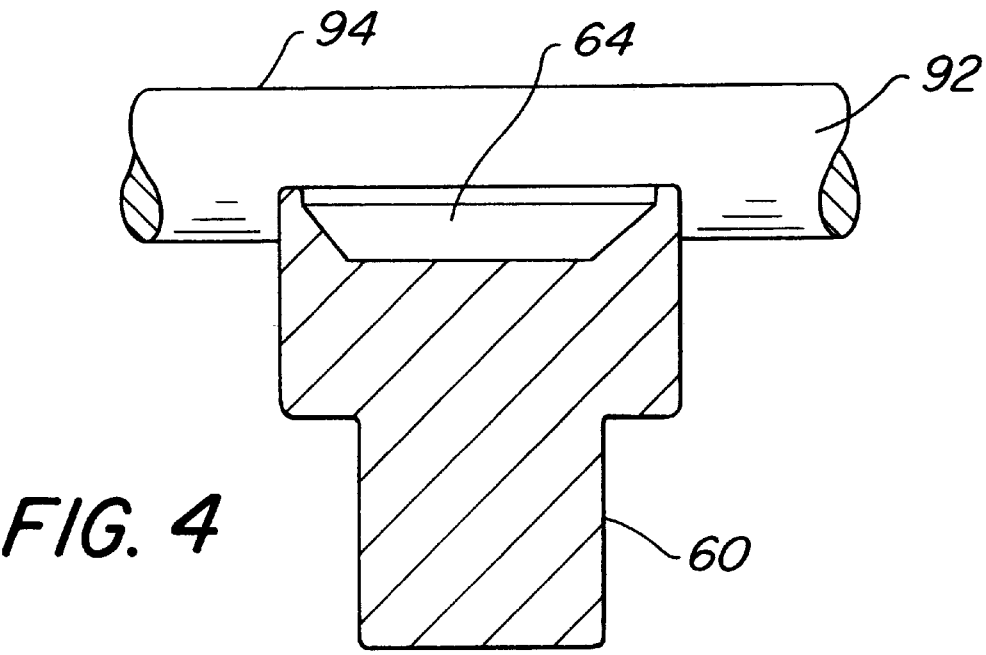
FIG. 4 is a partial cross-sectional view of a carrier bar, on an enlarged scale, taken along line 4—4 of FIG. 3.
Figure 5:
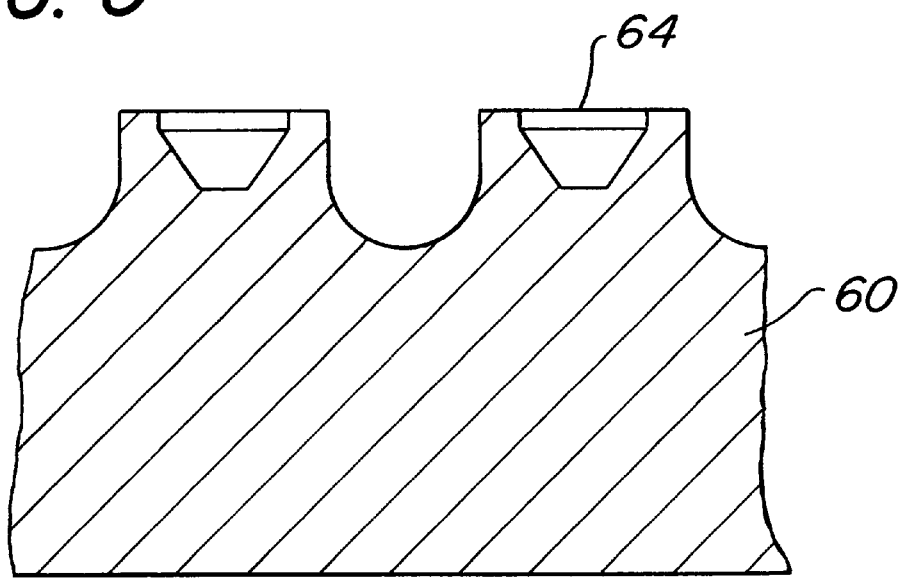
FIG. 5 is a partial cross-sectional view taken along line 5—5 of FIG. 3.

The pellet-marking machine 10, as seen in FIG. 1, has conveyor 16 which comprises a plurality of carrier bars 60 mounted on endless chains 62 as seen in detail in FIG. 3. Carrier bars 60 each have a plurality of cavities 64 which are sized and shaped to receive pellet-like items 14 as illustrated in FIG. 3 and in cross section in FIGS. 4 and 5. As seen in FIGS. 1 and 2, items 14 cascade downwardly through chamber 24 impacting baffle plates 32 and eventually settling on carrier bars 60. A portion 14a of the pellet-like items 14 are received in cavities 64 while another portion 14b are not received in the cavities and tend to pile up on the upper surface 66 of the carrier bars 60. Conveyor 16 moves in the direction indicated by arrow 18, moving the pellet-like items 14 through opening 68 in side wall 26a out of chamber 24 toward printing unit 20.

Cavities 64 hold pellet-like items 14 securely in orderly rows in a preferred position and orientation so that when the conveyor 16 transports the items 14 under the printing unit 20 (see FIG. 1) the indicia are legibly printed in the same location on each item. FIG. 1 shows a gravure type printing unit 20 having a contact wheel 70 which rotates in synchronization with the conveyor 16 to print indicia on row after row of pellet-like items held in cavities 64. Other types of printers, for example, laser printers or ink-jet printers are also synchronized to print on items arrayed in rows which pass beneath the printer in an orderly fashion. Thus, the disorganized jumble of pellet-like items 14b which are not received in cavities 64 cannot be allowed to exit the chamber 24 through opening 68 and pass beneath the print unit 20. The indicia will not be printed correctly on such items because they will not be oriented or positioned properly, and for a gravure type printer, the items 14b could be crushed by the contact wheel, forcing a shut down of the machine.

Figure 6:
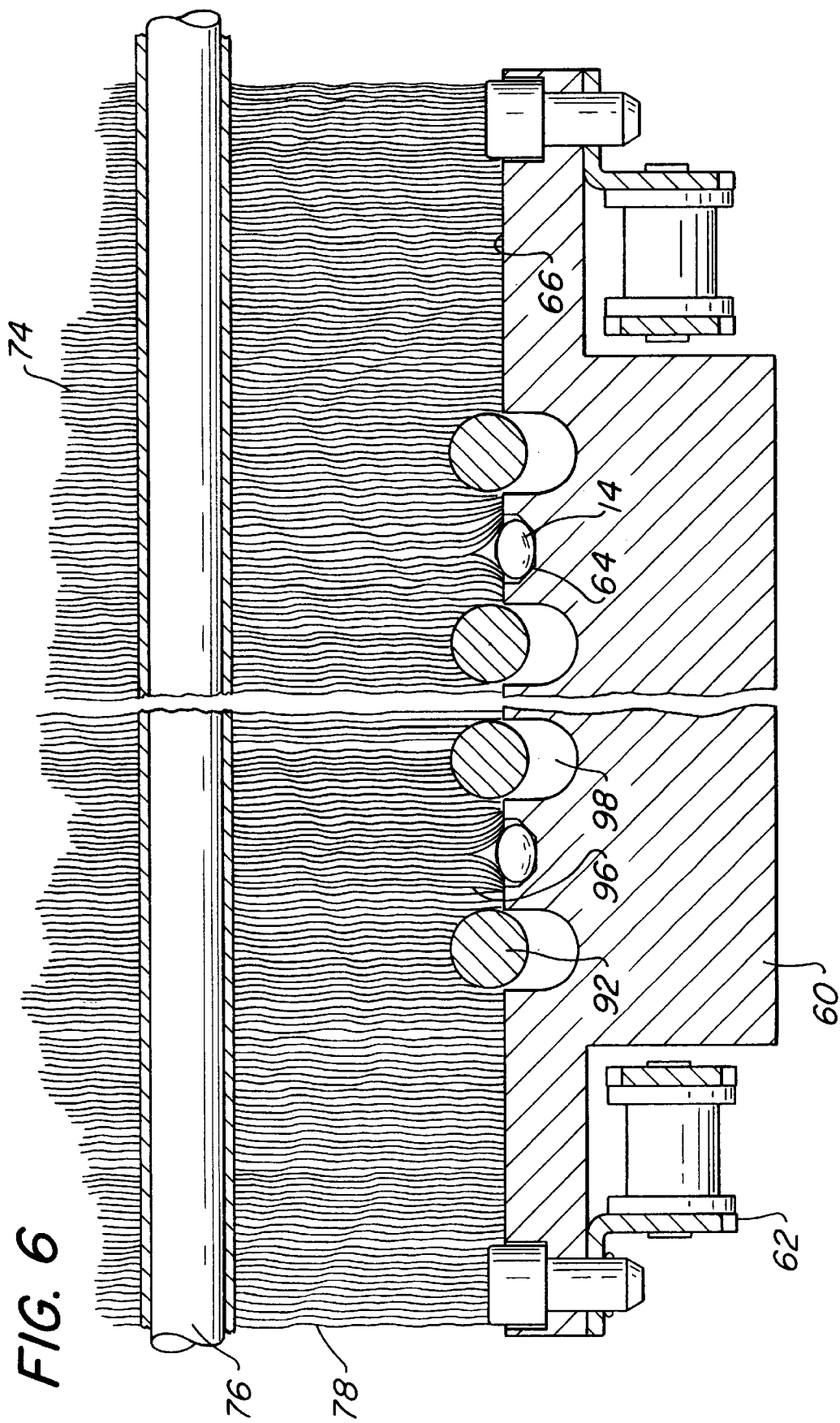
FIG. 6 is a partial cross-sectional view taken along line 6—6 of FIG. 2.
Figure 7:
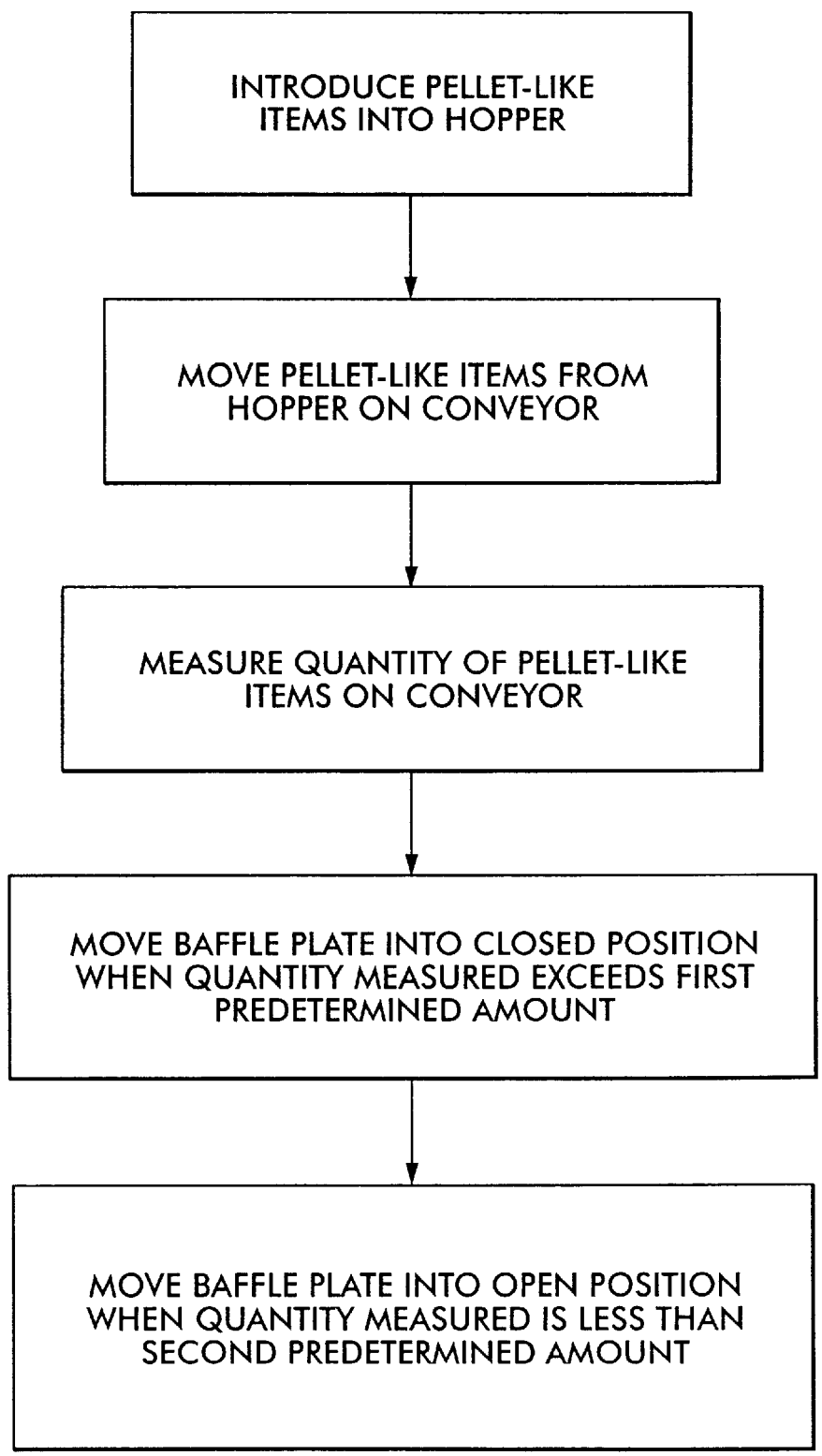
FIG. 7 is a flow chart describing a method of loading a conveyor according to the invention.

To prevent pellet-like items 14b which are not received in cavities 64 from exiting chamber 24 through opening 68, a guard member 72 is positioned adjacent the opening. Guard member 72 is positioned substantially transversely to the direction of motion of conveyor 16 and is positioned to engage the portion 14b of items 14 and retain them within chamber 24 until they are received within cavities 64. In the preferred embodiment, guard member 72 comprises an elongated rotating brush 74, best seen in FIGS. 2 and 6.

Brush 74 has an axis of rotation 76 oriented transversely to the direction of motion of the conveyor 16. Flexible bristles 78 extend radially outwardly from the axis 76 and engage the upper surface 66 of carrier bars as the bars pass beneath the brush. The brush is rotated about axis 76, preferably by an electric motor 80 in a direction opposed to the motion of the conveyor, the rotational motion of brush 74 being indicated by arrow 82. Upon rotation of the brush bristles 78 sweep across upper surface 66 of carrier bars 60, leaving the portion 14a of pellet-like items 14 in cavities 64 and allowing them to pass through opening 68. Bristles 78 engage and sweep the portion 14b of items 14 not in the cavities back into chamber 24. To provide extra assurance that none of the items of portion 14b get to the print unit 20, it is desirable to include a second rotatable brush 84 arranged in tandem with brush 74. Brush 84 has an axis of rotation 86 parallel to axis 76 and rotates counter to the direction of motion of conveyor 16 as indicated by arrow 88. Brush 84 has bristles 90 which engage upper surface 66 of carrier bars 60 and sweep any pellet-like items 14b not received in cavities 64 back toward brush 74.

As seen in FIG. 2, pellet-like items 14 fall onto conveyor 16 randomly oriented and do not necessarily align themselves with cavities 64 in the carrier bars 60. It is advantageous to provide guide bars 92, shown in FIGS. 3, 4 and 6, to orient pellet-like items 14 and encourage them to settle into cavities 64. Guide bars 92 are located beneath the bottom opening 30 of chamber 24 and are arranged in parallel spaced relationship, extending lengthwise along the direction of motion of conveyor 16. The guide bars are fixed in position relative to the conveyor. Two guide bars are arranged on either side of each cavity 64. The guide bars have upper surfaces 94 which extend above the upper surfaces 66 of carrier bars 60 and form a trough 96 with the cavities 64 at the bottom of the trough. Pellet-like items 14 which fall onto conveyor 16 encounter guide bars 92 and tend to be funneled into the troughs 96 and hence into the cavities 64. Guide bars 92 are especially effective when items 14 are elongated in shape, as the elongated items tend to roll off the guide bars and orient themselves into alignment with the cavities.

Preferably, guide bars 92 are positioned above grooves 98 formed in the carrier bars. Grooves 98 provide an escape route for pellet-like items which get by brushes 74 and 84 without being received in a cavity 64. Deflector plates (not shown) are positioned above the conveyor 16 between hopper 12 and the printing unit 20. The deflector plate will engage any pellet-like items not received in a cavity and bump them into one of the grooves 98. The pellet-like item will then pass beneath the printer without being crushed by the contact wheel 70 and be discharged to be sent through the machine again for printing.

The invention also includes a method of loading a movable conveyor with a multiplicity of pellet-like items. FIG.

7 shows a flow-chart illustrating the basic steps of the preferred method which include: (a) introducing pellet-like items into the feed hopper; (b) moving the pellet-like items from the hopper on the conveyor; (c) measuring the quantity of pellet-like items on the conveyor; (d) moving the movable baffle plate into the closed position when the quantity exceeds a first predetermined amount; and (e) moving the movable baffle plate into the open position when the quantity measured is less than the second predetermined amount.

As described in more detail, the method of loading a conveyor with a plurality of pellet-like items according to the invention includes the steps of: (a) positioning a feed hopper 12 (see FIG. 1) above the conveyor 16, the feed hopper comprising a chamber 24 having a top opening 28 and a bottom opening 30 overlying the conveyor; (b) providing a plurality of baffle plates 32 within the chamber 24, the baffle plates being angularly oriented with respect to the horizontal one above another and extending partially across the chamber; (c) providing an opening 68 in the chamber 24 adjacent to the conveyor 16 and transversely to the direction of motion of the conveyor; (d) introducing the multiplicity of pellet-like items 14 into the chamber 24 through the top opening 28, the items 14 passing through the chamber under gravity and contacting at least one of the baffle plates 32 before emerging from the bottom opening 30 onto the conveyor 16, the baffle plates 32 impeding the flow of the pellet-like items 14 from the hopper 12 to the conveyor 16; and (e) moving the pellet-like items 14 on the conveyor 16 from beneath the hopper 12 through the opening 68.

Method steps are also provided to limit the amount of pellet-like items 14 on conveyor 16 at any one time. These steps include: (a) providing a means for measuring the quantity of the pellet-like items on the conveyor, the measuring means preferably comprising light source 46 and light sensor 52; (b) providing a baffle plate 32a movable between an open position 38 allowing the pellet-like items 14 to move through the chamber 24, and a closed position 40 blocking the chamber between the top opening 28 and the bottom opening 30; (c) providing a means for moving the baffle plate 32a, the moving means being an actuator such as electrical motor 44 operatively associated with the movable baffle plate; (d) providing a means for controlling the moving means in response to the quantity measured by the measuring means, the controlling means preferably comprising a microprocessor 54; (e) measuring the quantity of pellet-like items 14 on the conveyor 16; (f) moving the movable baffle plate 32a into the closed position 40 with the moving means when the quantity measured exceeds a first predetermined amount, thereby halting the flow of the pellet-like items 14 through the hopper 12; and (g) moving the movable baffle plate into the open position 38 with said moving means when the quantity is less than a second predetermined amount less than the first predetermined amount, thereby permitting the flow of the pellet-like items 14 through the hopper 12 and onto conveyor 16.

When the method is used to load the conveyor of a pellet-marking machine further steps in the method are advantageous including: (a) providing a plurality of carrier bars 60 mounted on the conveyor 16, the carrier bars having a plurality of cavities 64 (see FIG. 3) each being adapted to receive one of the pellet-like items 14; (b) providing a guard member, preferably rotating brush 74 (see FIGS. 2 and 6) extending substantially transversely to the direction of motion of the conveyor and positioned adjacent to the opening 68; receiving a first portion 14a of the pellet-like items within the cavities 64, a second portion 14b of the pellet-like items not being received within the cavities; (c) engaging the second portion 14b of the pellet-like items with the guard member and thereby retaining the second portion within chamber 24; and (d) moving the first portion 14a of pellet-like items through opening 68 and out of chamber 24 on conveyor 16.

Use of a feed hopper having baffle plates according to the invention for feeding pellet-like items to a conveyor avoids overloading the conveyor with the items, eliminates the rotating drum used to transfer the items from the hopper to the conveyor and makes the machine incorporating the feed hopper simpler, more reliable, less expensive and able to process pellet-like items at a faster rate not limited by the speed at which a drum may rotate.

What is claimed is:

1. A feed hopper adapted to receive a multiplicity of items and discharge said items on a movable conveyor, said feed hopper comprising:

a chamber enclosed by a plurality of side walls, a first and a second of said side walls being oppositely arranged, said chamber having a top opening for receiving said items and a bottom opening positioned overlying said conveyor;

a plurality of baffle plates arranged within said chamber in spaced relationship one above another, said baffle plates extending partially across said chamber, a first of said baffle plates having a first edge adjacent to said first side wall and a second edge arranged distally to said first edge and extending toward said second side wall;

a second of said baffle plates having a first edge adjacent to said second side wall and a second edge arranged distally to said first edge and extending toward said first side wall, said second edge being at a lower level than said first edge for both said first and second baffle plates;

said first and second baffle plates being arranged vertically adjacent one above another, said first baffle plate being movable between an open position in said spaced relation to said second baffle plate, and a closed position wherein said second edge of said first baffle plate is contiguous with said second edge of said second baffle plate, thereby closing off said chamber and preventing movement of said items therethrough;

said items being introduced into said hopper through said top opening and impacting on at least one of said baffle plates, said baffle plates thereby impeding the flow of said items before they land on said conveyor;

one of said side walls being arranged substantially transversely to the direction of motion of said conveyor and having a side facing opening positioned adjacent to said conveyor allowing said items to be discharged from said chamber upon movement of said conveyor;

means for measuring a quantity of said items received on said conveyor;

means for moving said first baffle plate between said open and said closed positions; and means for controlling said moving means in response to said quantity measured by said measuring means, said controlling means causing said moving means to move said first baffle plate from said open to said closed position when said quantity exceeds a first predetermined amount, thereby preventing further of said items from being received on said conveyor, said controlling means causing said moving means to move said first baffle plate from said closed to said open position when said quantity is less than a second predetermined amount less than said first predetermined amount, thereby allowing further of said items to be received on said conveyor.

2. A feed hopper according to claim 1, wherein said first and second side walls are arranged transversely to the direction of motion of said conveyor, one of said first and second side walls being said side wall having said opening therein.

3. A feed hopper according to claim 1, wherein said first baffle plate is positioned below said second baffle plate and is rotatably movable between said open and said closed positions.

4. A feed hopper according to claim 3, wherein said first baffle plated is positioned lowermost within said chamber of said plurality of baffle plates.

5. A feed hopper according to claim 1, wherein at least one of said baffle plates has an upwardly facing surface comprising a layer of flexible material cushioning the impact of said items on said baffle plate.

6. A feed hopper according to claim 1, wherein said conveyor has a multiplicity of cavities for receiving and transporting said items, said feed hopper further comprising a guard member extending substantially transversely to the direction of motion of said conveyor and positioned adjacent to said opening being thereby engageable with a first portion of said items not received within said cavities, said guard member engaging and retaining said first portion within said chamber when said conveyor is moving, a second portion of said items being received in said cavities and not being engaged and retained by said guard member, said second portion being discharged through said opening and out of said chamber.

7. A feed hopper according to claim 6, wherein said guard member comprises:
  an elongated rotatable brush having a multiplicity of flexible bristles extending radially outwardly therefrom, said brush being rotatable about an axis arranged substantially transversely to the direction of motion of said conveyor; and
  means for rotating said rotatable brush operatively associated therewith, said brush being rotated in opposition to the motion of said conveyor, said bristles engaging said conveyor and sweeping said first portion of items not arranged within said cavities of said conveyor back into said chamber, thereby allowing only said second portion of said items received in said cavities to be transported through said opening and discharged from said chamber on said conveyor.

8. A feed hopper according to claim 7, wherein said brush is positioned outside of said chamber.

9. A feed hopper according to claim 6, further comprising at least two elongated guide bars mounted within said chamber and arranged parallel to the direction of motion of said conveyor, said guide bars being positioned in spaced relationship to each other on opposite sides of one of said cavities thereby forming a trough for guiding said items into said cavity.

10. A feed hopper according to claim 1, wherein said measuring means comprises:
  a light source mounted within said chamber, said light source projecting a light beam across said chamber at a predetermined level above said conveyor;
  a light sensor mounted within said chamber facing said light source and aligned to receive said beam, said light beam projecting unimpeded across said chamber from said light source to said light sensor when said items received on said conveyor are below the level of the light source, said light beam being interrupted by said items received on said conveyor when said items are above the level of said light source.

11. A feed hopper adapted to receive a multiplicity of items and discharge said items to a conveyor, said feed hopper comprising:
  a chamber having a top opening for receiving said items and a bottom opening positioned overlying said conveyor;
  a plurality of baffle plates arranged one above another within said chamber, said plates being angularly oriented with respect to the horizontal to selectively facilitate or retard the motion of said items through said chamber, said chamber comprising at least two oppositely arranged side walls, each of said baffle plates having one edge contiguous with one of said side walls and an opposite edge arranged at a lower level than said one edge, at least one of said baffle plates being arranged vertically adjacent to another of said baffle plates, said one baffle plate being movable into a position wherein said opposite edge of said one baffle plate is contiguous with said opposite edge of said other baffle plate, thereby closing said chamber and preventing said items from reaching said conveyor;
  an opening in said chamber for discharging said items therefrom, said opening being positioned adjacent to said conveyor; and
  a guard means positioned adjacent to said opening for engaging and retaining a first portion of said items within said chamber while allowing a second portion of said items to be discharged from said chamber through said opening.

12. A feed hopper according to claim 11, wherein said one baffle plate is rotatably movable into said position.

13. A method of loading a movable conveyor with a multiplicity of items, said method comprising the steps of:
  positioning a feed hopper above said conveyor, said feed hopper comprising a chamber having a top opening and a bottom opening overlying said conveyor;
  providing a plurality of baffle plates within said chamber, said baffle plates being angularly oriented with respect to the horizontal one above another and extending partially across said chamber;
  providing an opening in said chamber adjacent to said conveyor and transversely to the direction of motion of the conveyor;
  introducing said multiplicity of items into said chamber through said top opening, said items passing through said chamber under gravity and contacting at least one of said baffle plates before emerging from said bottom opening onto said conveyor, said baffle plates impeding the flow of said items from said hopper to said conveyor; and
  moving said items on said conveyor from beneath said hopper through said opening;
  providing a means for measuring a quantity of said items on said conveyor;
  providing a baffle plate movable between an open position allowing said items to move through said chamber to a closed position blocking said chamber between said top and said bottom openings;
  providing a means for moving said baffle plate in cooperation with said measuring means;
  providing a means for controlling said moving means in response to said quantity measured by said measuring means;
  measuring the quantity of items on said conveyor;
  moving said movable baffle plate into said closed position with said controlling means when said quantity exceeds a first predetermined amount, thereby halting the flow of said items through said hopper onto said conveyor; and
  moving said movable baffle plate into said open position with said controlling means when said quantity is less than a second predetermined amount less than said first predetermined amount, thereby permitting the flow of said items through said hopper.

14. A method of loading a conveyor according to claim 13, further comprising the steps of:

providing a plurality of carrier bars mounted on said conveyor, said carrier bars having a plurality of cavities each being adapted to receive one of said items;

providing a guard member extending substantially transversely to the direction of motion of said conveyor and positioned adjacent to said opening;

receiving a first portion of said items within said cavities, a second portion of said items not being received within said cavities;

engaging said second portion of said items with said guard member and thereby retaining said second portion within said chamber; and moving said first portion of said items through said opening and out of said chamber on said conveyor.

15. A method of loading a conveyor according to claim 14, wherein said guard member comprises a rotating brush having an axis of rotation oriented substantially transversely to the direction of motion of said conveyor and said engaging step comprises rotating said brush and thereby sweeping said items of said first portion back into said chamber.

* * * * *